United States Patent [19]
Philofsky et al.

[11] 3,718,830
[45] Feb. 27, 1973

[54] LIQUID COOLED ROTOR FOR DYNAMOELECTRIC MACHINES

[75] Inventors: Harold M. Philofsky, Pittsburgh; Sui-Chun Ying, Monroeville; Jacob Chottiner, McKeesport, all of Pa.

[73] Assignee: Westinghouse Electric Corporation, Pittsburgh, Pa.

[22] Filed: July 8, 1971

[21] Appl. No.: 160,648

[52] U.S. Cl. ................................310/64, 310/43
[51] Int. Cl. ..............................................H02k 1/32
[58] Field of Search..........310/52, 54, 45, 59, 61, 45, 310/64, 65; 285/47, 45, 235, 371, 423

[56] References Cited

UNITED STATES PATENTS

| | | | |
|---|---|---|---|
| 3,469,125 | 9/1969 | Kranz | 310/64 |
| 3,232,640 | 2/1966 | Donkle | 285/45 |
| 3,308,316 | 3/1967 | Pfahl | 310/71 |
| 3,440,594 | 4/1969 | Hopp | 310/71 |
| 3,524,090 | 8/1970 | Sark | 310/71 |
| 3,226,137 | 12/1965 | Trnka | 285/371 |

*Primary Examiner*—R. Skudy
*Attorney*—A. T. Stratton et al.

[57] ABSTRACT

A cooling system is provided for liquid cooled rotors including an improved insulating hose member incorporated in the cooling system to supply coolant liquid to the rotor winding. The improved hose member is a plastic tube with metal fittings enclosed in and reinforced by a glass filament wound housing which extends over the tube and axially beyond the metal fittings to form a substantially rigid, leak-proof, insulating hose member.

5 Claims, 2 Drawing Figures

PATENTED FEB 27 1973 3,718,830

LIQUID COOLED ROTOR FOR DYNAMOELECTRIC MACHINES

BACKGROUND OF THE INVENTION

The present invention relates to the cooling of rotors for dynamoelectric machines such as large turbine generators, and more particularly to an improved insulating hose member for use in the cooling system of a liquid cooled rotor.

Large turbine generators are usually of the inner cooled, or direct cooled, construction in which a coolant fluid is circulated through duct means in the stator and rotor slots in direct thermal relation with the current-carrying conductors inside the ground insulation. This type of construction provides a very effective cooling system and has made it possible to greatly increase the maximum ratings obtainable in large generators without exceeding the permissible limits of physical size. The coolant used in these machines has usually been hydrogen which fills the gas-tight housing and is circulated by a blower on the rotor shaft through the ducts of the stator and rotor windings and through suitable ducts in the stator core.

The maximum ratings required in large generators have continued to increase, however, making it necessary to further improve the cooling of these machines in the largest sizes. A substantial improvement in cooling can be obtained by the use of more efficient coolant fluids such as liquids. This has been done in stators by circulating a liquid coolant such as water through the ducts of the stator winding, and a significant improvement in cooling has thus been obtained. A substantial further improvement can be obtained by applying liquid cooling to the rotor by circulating water or other suitable liquid through passages in the rotor windings.

In a liquid cooled rotor the coolant is preferably introduced through the shaft and is distributed to passages in the winding conductors. Since the conductors are energized at the exciter voltage, the channels or conduits through which the liquid flows to the windings must include an insulating portion to insulate the windings from the grounded portions of the rotor. A similar requirement exists in water cooled stators, in which the water is distributed from manifolds through individual insulating connections to the coils of the stator winding, and plastic hoses with metal end fittings attached to them have been successfully used in stators for this purpose. The most satisfactory material for this purpose has been found to be polytetrafluoroethylene because of its inertness to water and its excellent resistance to thermal degradation at the maximum operating temperatures normally reached. This material is available under the trademark Teflon and for convenience will be referred to hereinafter by that name. The Teflon hoses used in water cooled stators operate under relatively low pressure, usually less than 100 pounds per square inch, and have no severe mechanical conditions or excessive stresses to withstand. Under these conditions these hoses have given very satisfactory performance and have long life in normal operation.

When applied to rotor cooling systems, however, the conditions under which the insulating hose members must perform are much more severe. Because of the high rotational speed, the internal water pressures which the hose must withstand may be very high, being not less than 1,200 p.s.i. under normal conditions, and may approach 2,000 p.s.i. under some conditions. Since the hoses are placed on the rotor on or near the outer surface, they are subjected to very high rotational forces during operation and must maintain their mechanical strength and resistance to internal pressures at temperatures as high as at least 95° C. Since the generator will be periodically stopped and restarted, the hoses must have long life under such cyclic loading conditions, and may be required to maintain their desirable characteristics for thousands of operating cycles over a period of many years. Tests have indicated that the standard Teflon hoses which have been used in water cooled stators are not satisfactory for use under the much more severe conditions to which they would be subjected on rotors. Various other types of insulating connectors have also been proposed for use in liquid cooled rotors as shown, for example, in U.S. Pats. to Gibbs et al. No. 3,131,321; Meyer, No. 3,255,298; and Tjernstrom, No. 3,504,207.

SUMMARY OF THE INVENTION

In accordance with the present invention, an insulating hose is provided for use in liquid cooled rotors which preserves the desirable characteristics of the hoses that have been used on stators but which is highly suitable for use on rotors and satisfactorily withstands the severe conditions discussed above. A Teflon hose is preferably used because of its known resistance to moisture and heat and its excellent characteristics for the general type of service here involved. Corrosion resistant end fittings, preferably of stainless steel, are secured to the ends of the plastic hose, and a reinforcing housing of glass filament is placed over the entire hose member. This housing is preferably a wound housing of resin-impregnated glass filament which is wound to a sufficient thickness over the entire device and extends axially over the metal end fittings. The housing is baked to cure the resin and a substantially rigid hose member results which is leak-proof and mechanically strong. Such a device has the required insulating characteristics and resistance to heat and moisture, and is capable of withstanding the severe conditions of use discussed above for a long life, even under cyclic loading conditions at relatively high temperature.

BRIEF DESCRIPTION OF DRAWINGS

The invention will be more fully understood from the following detailed description, taken in connection with the accompanying drawing, in which.

DESCRIPTION OF THE PREFERRED EMBODIMENT

Figure 1:
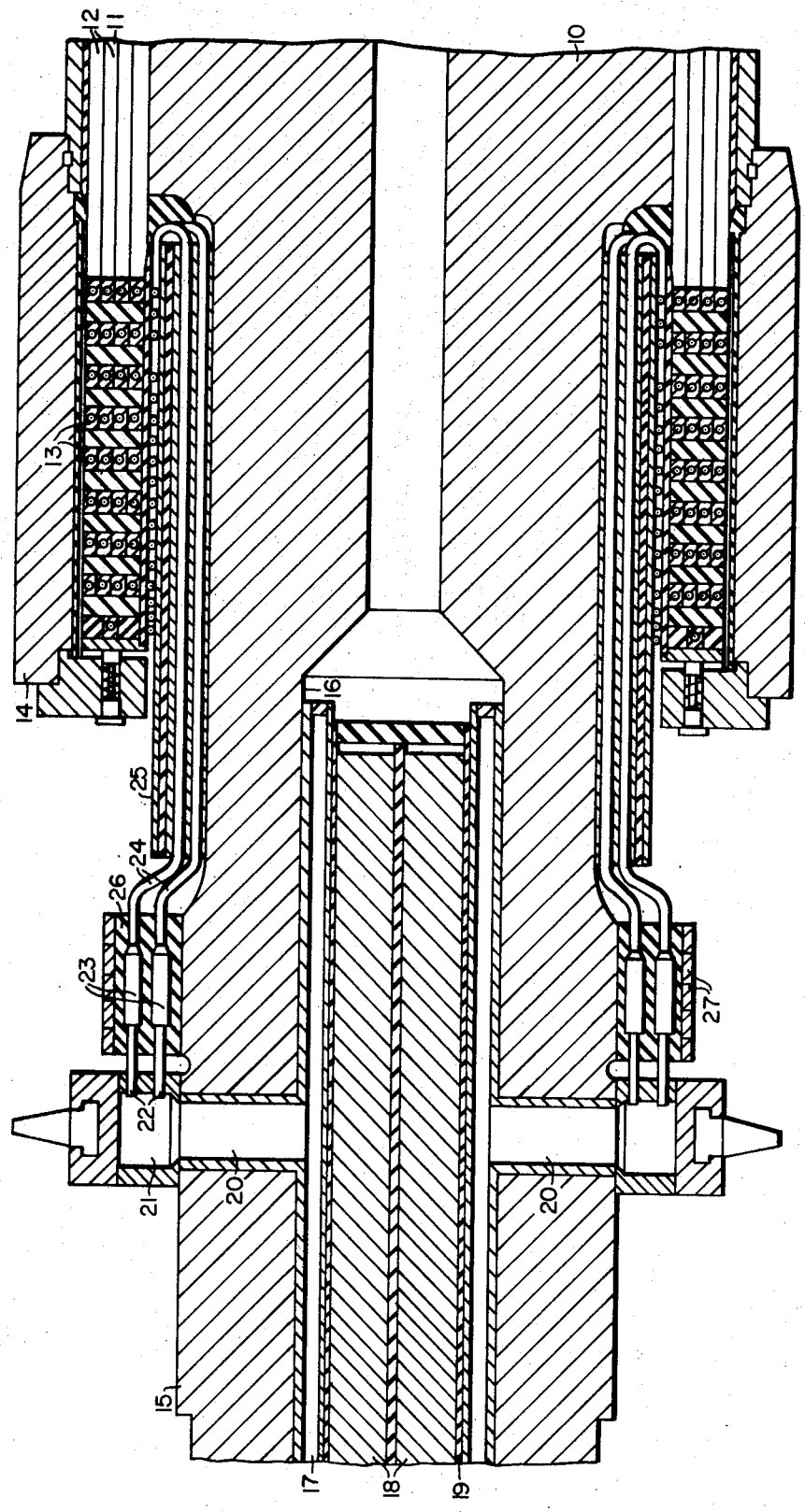
FIG. 1 is a longitudinal sectional view of a portion of a liquid cooled rotor showing the environment in which the invention is to be used.

The invention is shown in the drawing embodied in a cooling system for a liquid cooled rotor, only that part of the rotor being shown which is necessary to understand the invention. As shown in FIG. 1, the rotor has a body portion 10 which is provided with peripheral slots in the usual manner for the reception of a rotor winding 11. The rotor winding 11, which constitutes the field winding of a generator, may be arranged in any suitable manner in the slots of the rotor to form the desired number of magnetic poles, usually either two or four in machines of this type. The winding is constituted of copper conductors 12, which extend longitudinally through the slots of the rotor body and generally circumferentially in the end turn portions 13, which lie beyond the ends of the body portion 10 of the rotor, and which are supported against rotational forces by the usual heavy retaining rings 14. As can be seen in the end turn portions 13 which are visible in FIG. 1, the conductors 12 of which the winding 11 is composed are hollow or have central passages extending through them through which a coolant liquid flows from one end to the other. Any suitable or desired type of flow pattern may be utilized and any desired type of electrical circuit may be used.

The rotor has a shaft portion 15 integral with the body portion 10 and extending axially therefrom. The shaft portion 15 has an axial bore 16 extending therethrough which, in accordance with usual practice, may extend the entire length of the rotor from one end to the other. The particular rotor structure and cooling system shown in the drawing for the purpose of illustration are more fully disclosed and claimed in a copending application of L. P. Curtis et al., Ser. No. 144,050, filed May 17, 1971, and assigned to the assignee of the present invention. As more fully described in that application, a liquid coolant, preferably water, is introduced into the rotor through the shaft portion 15 and flows through an annular passage 17 in the bore 16. The annular passage 17 surrounds axial leads 18, which extend through the bore and provide electrical connection to the rotor winding 11 through conventional radial leads (not shown). The leads 18 are suitably insulated from the passage 17 and from each other by insulation 19. Water flowing through the annular passage 17 flows into radial passages 20 adjacent the inner end of the shaft 15, and through the passages 20 to an annular distributing chamber 21 on the surface of the shaft 15. Preferably, the annular passage 17 is formed by two concentric tubes of a corrosion resistant material such as stainless steel and the radial passages 20 are lined with the same material. The distributing chamber 21 is preferably also made of stainless steel or other suitable corrosion resistant material.

The water in the distributing chamber 21 is distributed to the individual conductors 12 of the rotor winding by a plurality of channels or conduits. Each of the channels may comprise a short metal tube 22, which may be copper or stainless steel, extending axially from the chamber 21 to an insulating hose member 23 which insulates the rotor winding from the grounded parts of the shaft 15. Connectors 24 of insulated copper or stainless steel tubing extend from the hose 23 to the conductors 12. The connectors 24 may be of any suitable type, and are shown as being disposed in slots in the surface of the rotor and retained therein by springs and wedges 25 in the manner more fully disclosed and claimed in a copending application of S. C. Ying et al., Ser. No. 170,828, filed Aug. 11, 1971, and assigned to the assignee of this invention. The connectors 25 are preferably of the type disclosed in that application, although any suitable type of connector may of course be used, and they are individually connected to the end turn portions 13 of the conductors 12 of the rotor winding to supply cooling water thereto. The water thus introduced into the rotor winding flows through the conductors to the other end and may be discharged through similar connectors to a collecting chamber and through the bore of the shaft in the manner disclosed in the above-mentioned Curtis et al application, or in any other suitable manner.

It will be seen that an essential element of a cooling system of this type is the insulating hose 23 which conveys coolant liquid from the distributing chamber through an individual connector to a winding conductor, and which must be capable of insulating the conductor from the grounded rotor shaft. It will also be evident that since the hose member 23 is necessarily disposed at or near the rotor surface, it is subjected to very high rotational forces during operation, as well as to cyclic loading under relatively high temperature conditions, and thus must withstand very severe conditions of operation as discussed previously. The hose member 23 must therefore be designed and constructed in a manner which enables it to satisfactorily withstand these difficult conditions. In the illustrated embodiment of FIG. 1, the hose members 23 are held in position on the periphery of the shaft portion 15 of the rotor by any suitable means such as a support ring 26 of insulating material, or by slots or teeth on the shaft, with steel retaining rings 27 shrunk over the ring 26 or the teeth. The hose members 23 must of course be designed to withstand the severe forces to which they are subjected in spite of the supporting means that may be provided for them, the particular arrangement shown being only illustrative as any other desired mechanical support may be utilized for the hose members.

Figure 2:
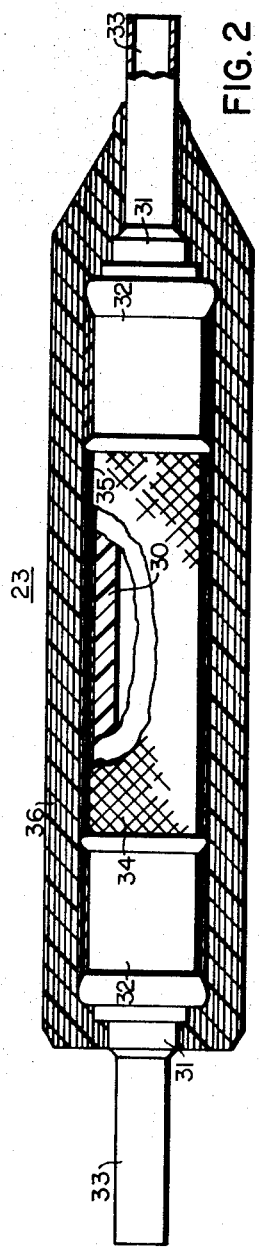
FIG. 2 is a longitudinal sectional view of a hose member embodying the invention.

In accordance with the present invention, an improved hose member is provided as shown in detail in FIG. 2. As there shown, the hose member 23 consists of a plastic tube 30 which may be made of any suitable heat and moisture resistant material, but which is preferably made of Teflon for the reasons previously indicated, as this has proved to be the most satisfactory available material for this type of service. Metal fittings 31 are provided at each end of the tube 30. As shown in the drawing, each of the fittings 31 includes a sleeve portion 32, which fits over the plastic tube 30 and is swaged or otherwise securely attached to the tube 30, and an extending tubular portion 33 which extends axially to provide for connection to the hose member 23. The fittings 31 are preferably made of stainless steel, although other suitable corrosion resistant materials might be used. In the illustrated embodiment, the Teflon tube 30 is shown with a braided covering 34, which may be of nylon impregnated with a suitable resin, since such braided coverings are commonly applied by the suppliers of Teflon tubing.

As previously discussed, Teflon tubes with metal fittings attached have been found satisfactory for some types of service, such as water cooled stators, but do not have satisfactory characteristics for use alone in rotor cooling systems of the type described. In accordance with the present invention, therefore, a reinforced hose member is provided by applying a suitable housing over the tube 30. In doing this, it is preferable to first provide a suitable surface. If any voids are present under the lips of the fitting portions 32, such voids should be filled with a suitable resin, such as an epoxy resin. An inner layer of insulating material 35 is then applied over the surface of the tube 30. The inner layer 35 preferably consists of glass filament, and is wound on the braided surface of the tube 30 and the surfaces of the fitting portions 32 to fill all spaces between the extremities of the sleeve portions 32 of the fittings at opposite ends and to provide a smooth cylindrical surface. If desired, other suitable insulating materials might be utilized, such as layers of resin-impregnated glass or dacron tape to fill the irregularities and provide a smooth cylindrical surface.

A filament wound outer housing 36 is then applied. This is done by winding glass filaments impregnated with a suitable resin such as an epoxy resin to build up a housing 36 extending from one end to the other of the hose member and extending axially over the fittings 31 as shown. The filament may be wound under tension at any suitable angle or may be circumferential, as desired, and the winding is continued until a suitable radial thickness has been built up. The completed member is then baked at a suitable temperature for the necessary time to cure the resin with which the filament is impregnated, and a substantially rigid, leak-proof, insulating hose member is thus produced. Tests have shown that such a hose member is greatly superior to any other known device for the service for which it is intended on liquid cooled rotors. The new hose member is capable of withstanding the relatively high temperatures and high internal pressures to which it is subjected in service, for extended times, as well as the high rotational forces which occur.

It should now be apparent that a new and improved insulating hose member has been provided for use in the cooling systems of liquid cooled rotors in large dynamo-electric machines. The new hose member is particularly suited for this service, although it will be apparent that it may also be used in other applications where similarly severe conditions are encountered. It will also be understood that although certain specific materials have been mentioned as being preferred, other materials might also be used where conditions are such that they would be suitable. Thus, for example, instead of Teflon the plastic tube 30 might be made of other suitable materials such as nylon or polyethylene in cases where their characteristics would be suitable for the conditions under which they were to be used. Similarly, any suitable thermosetting resin might be used for impregnating the glass filament winding of the housing 36. It will be understood therefore that although a specific embodiment of the invention has been shown and described for the purpose of illustration, the invention is not limited thereto, but includes all equivalent embodiments and modifications.

We claim:

1. In a liquid cooled rotor for a dynamoelectric machine, a cooling system for circulating liquid coolant through conductors of the rotor winding, said system including a coolant chamber on the rotor and a plurality of connectors for flow of coolant liquid between said chamber and the winding conductors, each of said connectors including an insulating hose member, each hose member comprising a heat and moisture resistant plastic tube, metal fittings attached to each end of the tube, and a housing of resin-impregnated glass filaments enclosing the tube and fittings to form a substantially rigid, leak-proof, insulating hose member, said housing comprising a winding of glass filaments wound tightly over the plastic tube and extending axially over the metal fittings, said glass filaments being impregnated with a thermosetting resin and baked to cure the resin.

2. The structure of claim 1 in which said plastic tube is polytetrafluoroethylene.

3. The structure of claim 1 in which said housing comprises an inner layer of insulating material covering the plastic tube and fittings and providing a smooth cylindrical surface and an outer winding of glass filaments wound tightly over the inner layer and extending axially over the metal fittings, said glass filaments being impregnated with a thermosetting resin and baked to cure the resin.

4. The structure of claim 3 in which said inner layer of insulating material comprises glass filaments impregnated with a thermosetting resin.

5. The structure of claim 3 in which the plastic tube is polytetrafluoroethylene.

* * * * *